United States Patent
Storey et al.

(10) Patent No.: US 6,679,071 B1
(45) Date of Patent: Jan. 20, 2004

(54) REFRIGERATED CONTAINER CONTROL SYSTEM

(75) Inventors: John Gerard Anthony Storey, Dublin (IE); Daniel Nelson, Grange (IE)

(73) Assignee: Synchro Data Limited, Dublin (IE)

( * ) Notice: Subject to any disclaimer, the term of this patent is extended or adjusted under 35 U.S.C. 154(b) by 0 days.

(21) Appl. No.: 10/129,363

(22) PCT Filed: Nov. 3, 2000

(86) PCT No.: PCT/IE00/00136

§ 371 (c)(1),
(2), (4) Date: Nov. 4, 2002

(87) PCT Pub. No.: WO01/33149

PCT Pub. Date: May 10, 2001

(30) Foreign Application Priority Data

Nov. 3, 1999 (IE) .................................... S990914

(51) Int. Cl.[7] .......................... F25B 49/00; G05D 23/00
(52) U.S. Cl. ........................................ 62/126; 236/51
(58) Field of Search ............................ 236/51; 62/126, 62/132; 340/870.17, 585

(56) References Cited

U.S. PATENT DOCUMENTS

| 4,851,822 A | 7/1989 | Barnett ..................... 340/635 |
|---|---|---|
| 4,970,496 A | * 11/1990 | Kirkpatrick ................. 340/585 |
| 5,104,037 A | * 4/1992 | Karg et al. ................. 236/51 X |
| 5,181,389 A | 1/1993 | Hanson et al. ................. 62/126 |
| 5,424,720 A | 6/1995 | Kirkpatrick ................. 340/585 |
| 5,448,220 A | 9/1995 | Levy .......................... 340/539 |
| 5,499,512 A | 3/1996 | Jurewicz et al. ............. 62/229 |
| 5,826,195 A | 10/1998 | Westerlage et al. ......... 455/456 |
| 5,917,433 A | 6/1999 | Keillor et al. ............... 340/989 |
| 5,969,606 A | * 10/1999 | Reber et al. ................ 340/540 |

FOREIGN PATENT DOCUMENTS

| EP | 0 321 253 A2 | 6/1989 | .......... G05D/23/19 |
|---|---|---|---|
| EP | 0 321 253 A | 6/1989 | .......... G05D/23/19 |
| EP | 0 935 181 A2 | 8/1999 | .......... G05D/23/19 |
| EP | 0 935 181 A | 8/1999 | .......... G05D/23/19 |
| FR | 2 712 405 | 5/1995 | .......... G05D/23/19 |
| FR | 2712405 A | 5/1995 | .......... G05D/23/19 |
| WO | WO 93/16450 | 8/1993 | .......... G08C/17/00 |

* cited by examiner

Primary Examiner—William Wayner
(74) Attorney, Agent, or Firm—Birch, Stewart, Kolasch & Birch, LLP

(57) ABSTRACT

A temperature responsive refrigerated transport container having a self contained refrigeration plant in which a short range radio transmits a sensed temperature to a remote operator panel using an identity code with the panel controlling the plant via a radio transmitter using an operating signal generated at the panel.

10 Claims, 14 Drawing Sheets

REFRIGERATED CONTAINER CONTROL SYSTEM

This application is the national phase under 35 U.S.C. § 371 of PCT International Application No. PCT/IC00/00136 which has an International filing date of Nov. 3, 2000, which designated the United States of America.

BACKGROUND OF THE INVENTION

1. Field of the Invention

The invention relates to a control system for refrigerated transport containers.

2. Discussion of the Prior Art

Vehicle mounted refrigerated transport containers are widely used for the transport of perishable goods. Where the container is incorporated in a rigid vehicle an associated refrigeration plant is generally mounted above the vehicle cab. In the case of articulated vehicles, which generally haul removable refrigeration containers, a refrigeration plant is usually mounted at the front end of each individual refrigeration container furthest away from the container doors. In both types of vehicle the refrigeration plants are generally started and controlled locally. Control and monitoring to ensure proper operation requires the driver/operator to have direct access to the refrigeration plant. With rigid vehicles this often necessitates climbing up above the vehicle cab in order to operate the refrigeration plant. As will be appreciated this is somewhat inconvenient and dangerous, as an operator may lose his footing. In both types of vehicle the operator has to stop the vehicle and leave the cab in order to check the operation of the refrigeration plant. This is inconvenient and time consuming and may also be very uncomfortable in bad weather conditions. To ensure proper operation, monitoring of the refrigeration plant needs to be carried out regularly. This may easily be overlooked or deferred due to the inconvenience involved, or if the driver does not have time to stop—for example if the driver has to meet a ferry departure time at a shipping port. This can lead to refrigeration breakdowns or ineffective operation of the refrigeration unit which results in a costly loss of goods which are either destroyed or of unacceptable quality when they reach a delivery destination. There is also a considerable negative environmental impact associated with disposal of the damaged goods.

The present invention is directed towards overcoming these problems.

SUMMARY OF THE INVENTION

According to the invention there is provided a control system for a refrigerated transport container of the type comprising a self contained refrigeration plant connected to an associated enclosed refrigeration compartment within the container and operable to regulate the temperature within the compartment, the control system comprising:

sensing means for mounting on the refrigerated transport container for sensing at least one critical operating parameter of the refrigerated transport container, said sensing means being connected to a radio signal generating means for generating a radio frequency signal corresponding to said sensed parameter condition, said ratio signal generating means being connected to a short range radio transmitter for transmitting said measured parameter radio signal together with an associated refrigerated transport container identity code radio signal, a remote operator panel having a radio receiver with means for reception of a radio signal incorporating the refrigerated transport container identity code, the remote operators panel having a display means for indicating a fault condition of said measured parameter, said remote operator panel radio receiver being connected to the display means for fault indication, the remote operator panel having means for generating an operating signal to control operation of the refrigeration plant with a view to correcting any abnormal operating condition sensed by said sensing means, said operating signal generating means being connected to a radio signal generating means for generating a radio frequency signal corresponding to said operating signal, said radio signal generating means being connected to a short range radio transmitter for transmitting said radio signal together with the associated refrigerated transport container identity code radio signal, a radio receiver for mounting on the refrigerated transport container having means for reception of a radio signal incorporating said refrigerated transport container identity code, and said radio receiver being connected to a refrigeration plant controller which is operable in response to reception of an operating signal to control operation of the refrigeration plant.

In a particularly preferred embodiment, said remote operator panel is a portable hand-held unit.

In a preferred embodiment the short range radio transmitters are operable to transmit radio frequency signals at 433 megahertz.

In a further embodiment refrigeration plant controller is connected in parallel to the normal operating controls of the refrigeration plant to allow either remote operation or local operation of the refrigeration plant.

In another embodiment the remote operator panel has a visual display for visual indication of the parameter measured by the sensor.

In another embodiment the remote operator panel has alarm means for generating an audible alarm in response to a sensed fault in the measured refrigerated transport container operating parameter.

In a further embodiment the remote operator panel has means for switching the refrigeration plant on or off.

In another embodiment the sensor is at least one temperature sensor mounted within the refrigeration container.

The temperature sensor may incorporate a short-range radio transmitter for wireless transmission of sensed temperature to the refrigeration plant controller or to the remote operator panel.

In a particularly preferred embodiment of the invention the remote operator panel includes an emergency defrost control circuit which allows the normal defrost circuit of the refrigeration unit to be operated at any time necessary during emergency situations. Preferably the emergency defrost control circuit includes re programmable timers, incorporating several electronically controlled parameters to safeguard unwarranted use of the emergency system.

In another aspect the invention provides a monitoring system for a refrigerated transport container of the type comprising a self-contained refrigeration plant connected to an associated enclosed refrigeration compartment within the container and operable to regulate the temperature within the compartment, the monitoring system comprising:

sensing means for mounting on the refrigerated transport container for sensing at least one critical operating parameter of the refrigerated transport container;

said sensing means being connected to a radio signal generating means for generating a radio frequency signal corresponding to said sensed parameter condition;

said radio signal generating means being connected to a short-range radio transmitting for transmitting said measured parameter radio signal, together with an associated refrigerated transport container identity code radio signal;

a remote operator panel having a radio receiver with means for reception of a radio signal incorporating the refrigerated transport identity code;

the remote operator panel having a display means for indicating a fault condition of said measured parameter, said remote operator panel radio receiver being connected to the display means for fault indication.

In a further aspect the invention provides a method for controlling operating conditions in a refrigerated transport container, comprising the steps:

sensing at least one critical operating parameter of the refrigerated transport container;

generating a radio frequency signal corresponding to said sensed parameter condition;

coupling said measured parameter radio signal, together with a refrigerated transport container identity code radio frequency signal both forming a composite radio frequency signal;

transmitting said composite radio frequency signal on a short-range radio transmitter;

on a remote operator panel receiving said composite signal incorporating the said refrigerated transport container identity code on a radio receiver of the remote operator panel;

displaying any measured parameter abnormal operating condition on the remote operator panel;

generating an operating signal to control operation of the refrigeration plant with a view to correcting any abnormal condition;

generating a radio frequency signal corresponding to said operating signal and coupling said radio frequency operating signal with the refrigerated transport container identity code radio frequency signal thus forming a composite radio frequency signal;

transmitting said composite signal on a short-range radio transmitter; and receiving said composite signal on a radio receiver associated with a refrigeration plant controller for the refrigerated transport container, said operating signal directing the refrigeration plant controller in operating the refrigerating plant.

BRIEF DESCRIPTION OF THE DRAWINGS

The invention will be more clearly understood from the following description of some embodiments thereof, given by way of example only, with reference to the accompanying drawings in which:

FIG. 19 is an illustration of an operator panel for the control system;

DETAILED DESCRIPTION OF PREFERRED EMBODIMENTS

Figure 1:
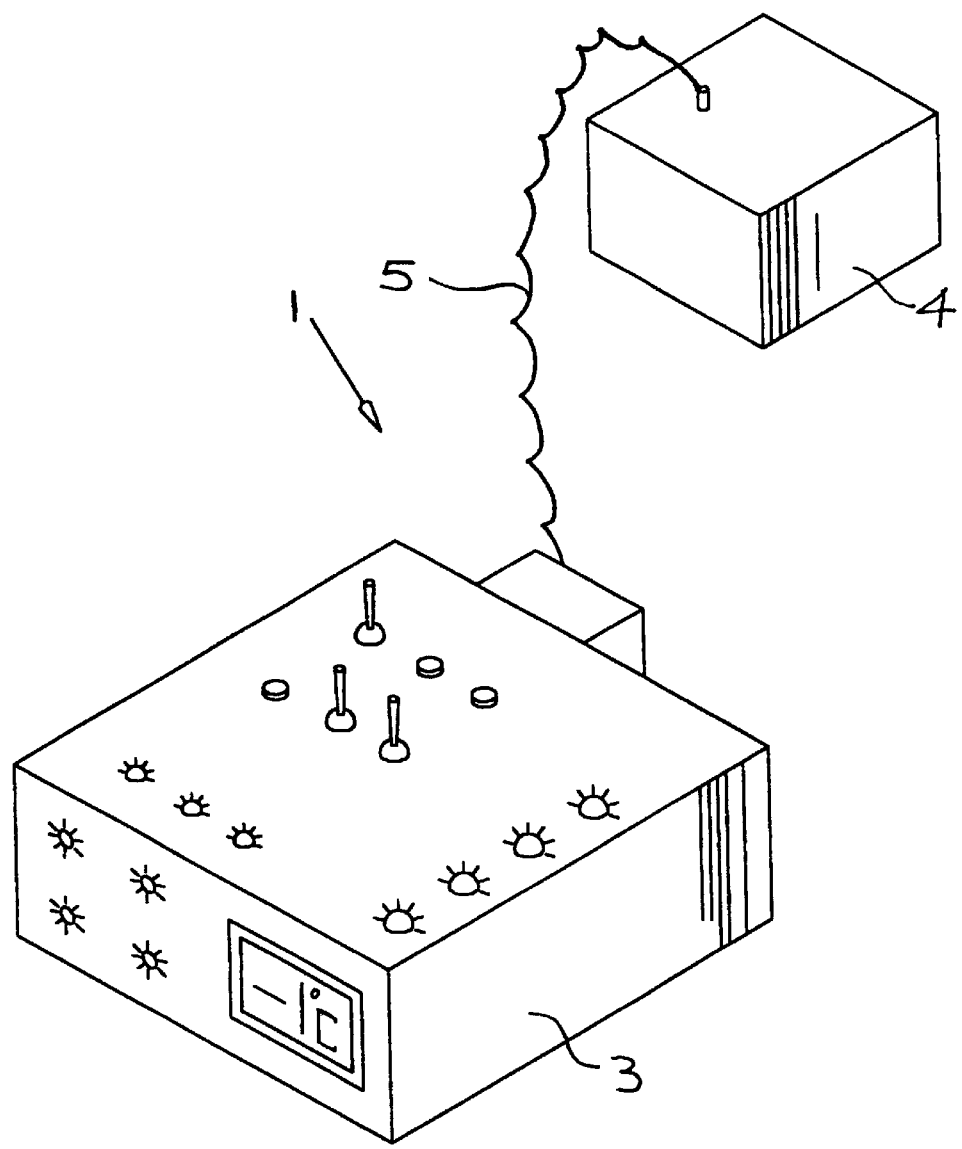
FIG. 1 is a perspective view of a refrigerated container control system according to the invention.
Figure 2:
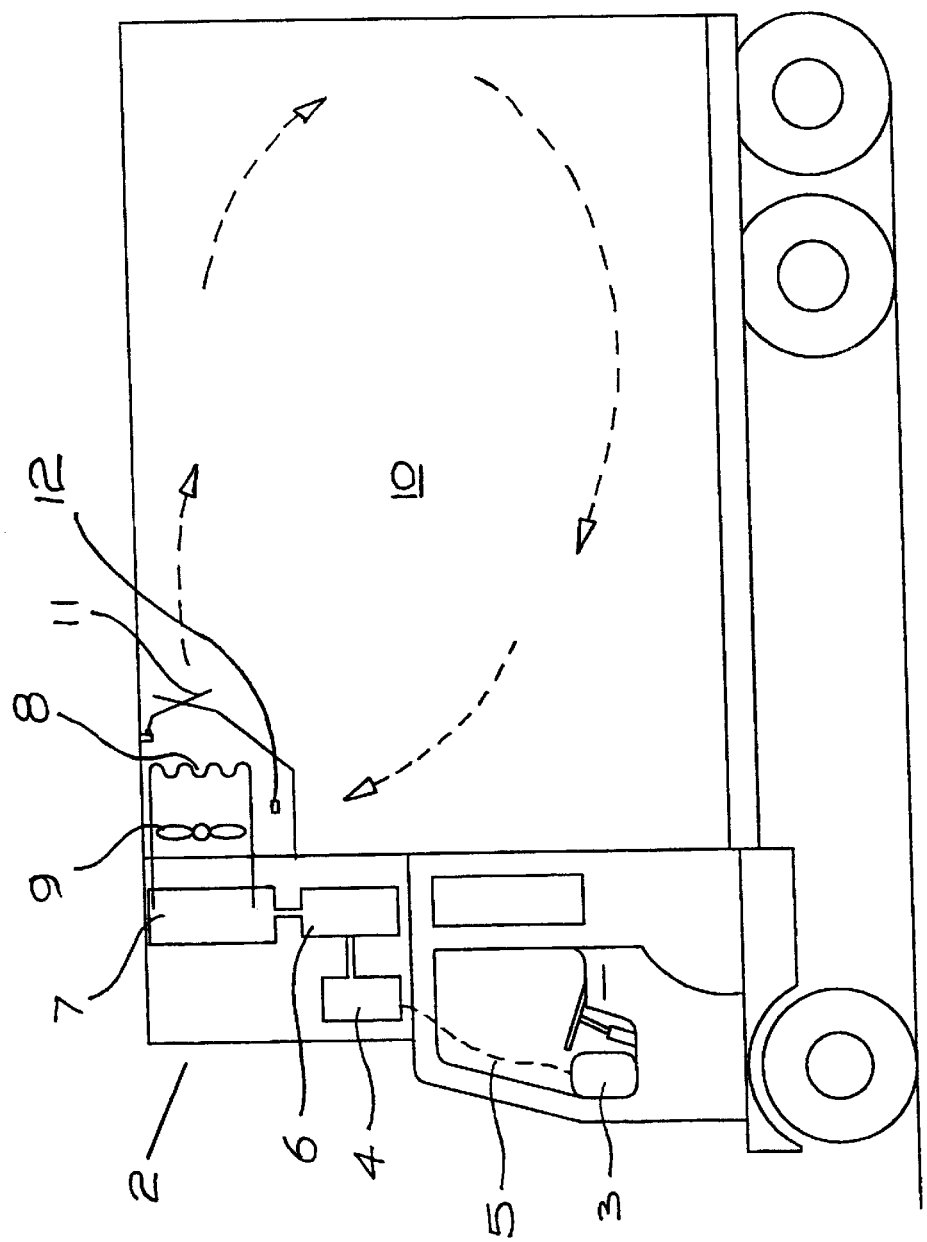
FIG. 2 is a schematic representation of a vehicle with a refrigerated transport container incorporating the control apparatus of FIG. 1.
Figure 3:
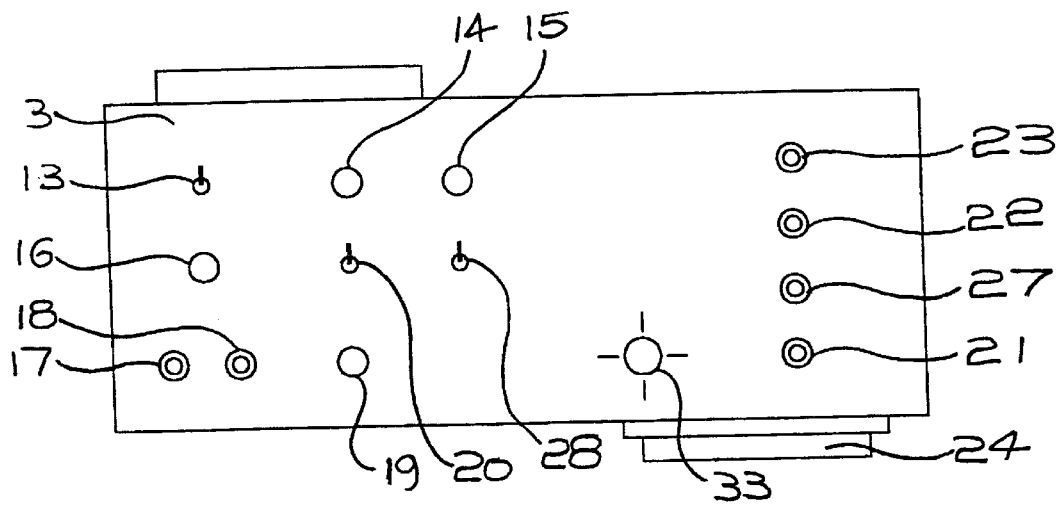
FIG. 3 is a plan view of portion of the control system of FIG. 1.
Figure 4:
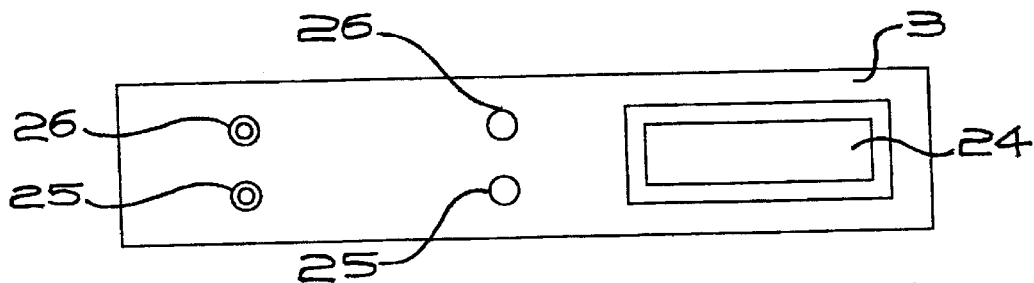
FIG. 4 is a front elevation view of portion of the control system of FIG. 1.
Figure 5:
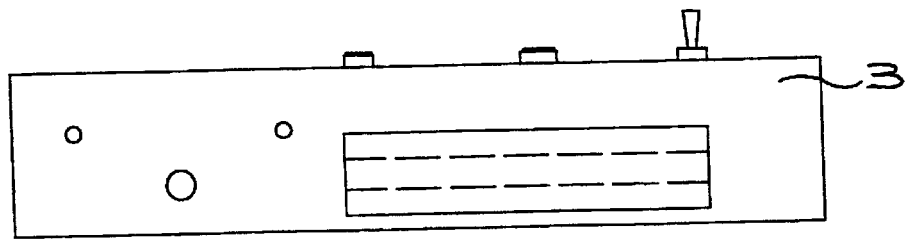
FIG. 5 is a rear elevation view of portion of the control system of FIG. 1.

Referring to the drawings, and initially to FIGS. 1 to 6 thereof, there is illustrated a refrigerated container control system of the invention, indicated generally by the reference numeral 1, for a vehicle mounting a refrigerated transport container forming a refrigeration unit 2. The control system 1 comprises a control means including a remote operator panel 3 for controlling the operation of the refrigeration unit 2 and a refrigeration plant controller including a relay assembly 4 for operating the refrigeration unit 2 in response to the control means. Short-range radio frequency signals 5 at 433 MHz provide a wireless connection between the remote operator panel 3 and the controller with relay assembly 4. The remote operator panel 3 can be mounted in the vehicle cab or within an unspecified radius of the relay assembly 4, which is mounted in close proximity to the refrigeration unit 2. When within this unspecified radius of the relay assembly 4 the operational conditions are automatically sensed by the remote operator panel 3. The remote operator panel 3 may have the facility to be powered by an external power supply from the vehicle cab or by its own internal battery power supply.

A preferred refrigeration unit is of conventional construction and may include an automotive power drive 6 which drives a refrigeration compressor 7 having an associated evaporator coil 8 through which air is blown by a fan 9 to circulate and control the air temperature within a confined area 10 defined by a compartment within the container for carriage of perishable goods. Discharge of air from the fan 9 to the temperature controlled area 10 is through a discharge chute at the outlet of which may be incorporated a solenoid controlled damper flap 11. An electrical/electronic sensor 12 such as a "KLIXON" switch forming part of the defrost circuit of the refrigeration unit 2 is located adjacent the evaporator coil 8 and is temperature reactive. The state of the sensor adjusts according to the temperature of the evaporator coil and when it reaches a pre determined temperature provides a signal for the initiation of the defrost cycle. In order for the temperature to be controlled within very precise parameters of set point a modulation control system may be utilised. The unit may incorporate a safety system which may be activated whenever the refrigeration unit 2 is switched on protecting against low oil pressure or high water temperature in the automotive power unit 6 and will stop the unit 6 in either of these two situations The remote operator panel 3 includes operational means, monitoring means and alarm means for the refrigeration unit 2. The operational means includes an on/off switch 13, which in turn operates a remote relay, which activates the control circuitry of the refrigeration unit. A preheat switch 14 and or a start switch 15 are used to start the automotive power unit 6 of the refrigeration unit 2, operation of the preheat switch 14 supplying, again through a remote relay the necessary current to the heater plugs of an automotive power unit 6 when required. Operation of the start switch 15 supplies, again through a remote relay the necessary current to energise the starter motor of the automotive power unit 6. Operation of the preheat switch 14 also deactivates a safety system associated with the refrigeration unit 2. The safety system may have a time delay of approximately 30 seconds while the preheating time could be anything up to 120 seconds or beyond. When the preheating cycle has finished the safety system will be automatically reactivated. As each component is energised a signal is sent to the remote operator panel 3 visually confirming to the panel operator each component has correctly or incorrectly been energised.

A remote manual defrost switch 16 is provided to enable the refrigeration unit 2 to be switched onto a defrost cycle manually. Operation of the remote manual defrost switch 16 switches the refrigeration unit 2 onto a heat cycle and activates a damper flap 11 blocking air discharge from the fan 9 into the temperature controlled area 10. Visual indication that the refrigeration unit 2 is on the heat cycle and that the damper flap 11 has closed is given by way of two LED's 17 and 18 respectively. The manual defrost switch 15 will not activate the defrost system if the temperature controlled area is not at a prerequisite temperature which may vary from unit to unit. To check whether or not the unit is ready for defrost there is provided on the operator panel an led to indicate defrost initiation status, i.e. if the defrost system is ready for operation. Also provided on the remote operator panel 3 is an emergency defrost switch 20 which provides an auxiliary defrost system control circuit in emergency situations when the existing system fails. Visual indication that this emergency defrost switch 20 has been activated is provided by a flashing led 21 on the operator panel 3. Further the emergency defrost circuit is provided with a timer which will switch the unit from the defrost mode to normal operation mode after a predetermined period of time.

Monitoring means for the refrigeration unit 2 is provided by a temperature probe located within the temperature controlled area 10 leading back to the relay panel where a sensed temperature is converted into a radio frequency signal and a short range radio frequency transmitter transmits the temperature data back to an associated receiver in the remote operator panel 3 where a visual readout of the temperature within the temperature controlled area 10 is displayed on a readout 24. Also a pair of LED's 25 indicate whether the refrigeration unit 2 is running on high speed or on low speed. Indication of whether the automotive power unit 6 is in the preheat or start mode is also given by a pair of LED's 26.

A visual alarm means is provided by an LED 27 on the operator panel 3 to give warning of low oil pressure or high water temperature in the automotive power unit 6 of the refrigeration unit 2. Also provided is an audible sounding device 33 utilised to highlight malfunctions associated with the refrigeration unit.

If required the lights on the operator panel 3 can be switched off by means of a lights out switch 28 however this does not disconnect the alarm LED 27 or the emergency defrost LED 21.

Figure 6:
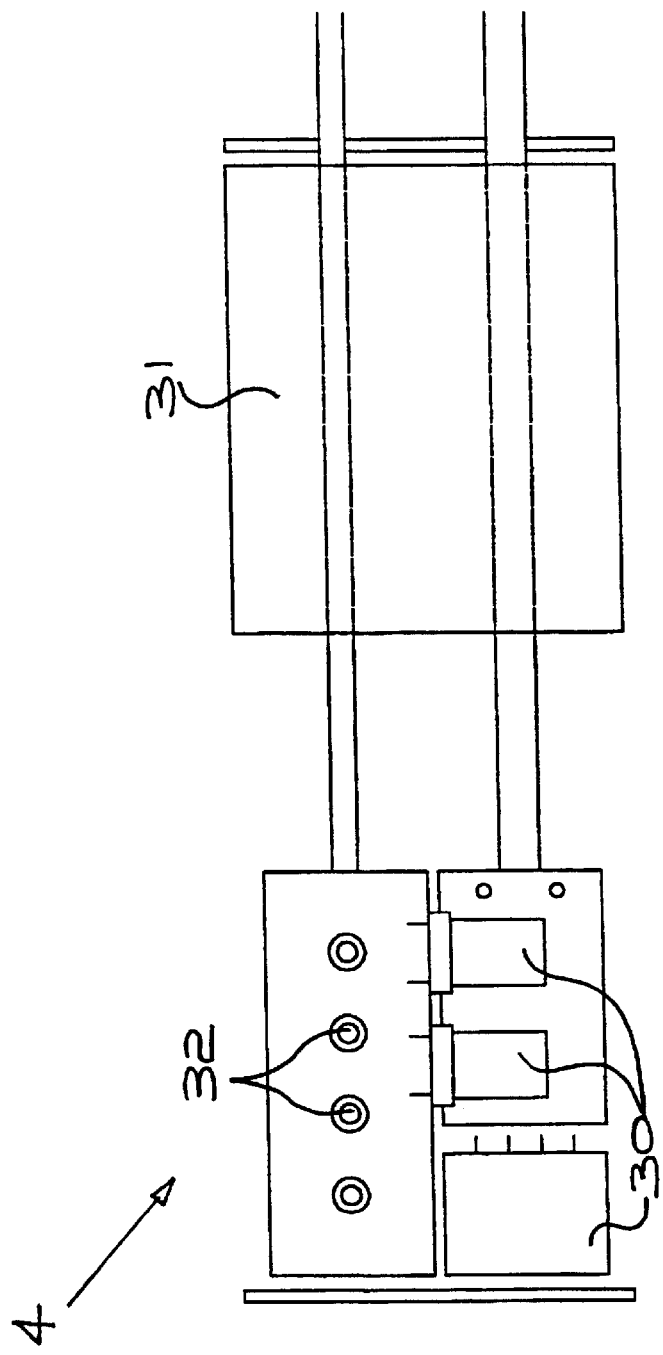
FIG. 6 is an exploded view of portion of the control system of FIG. 1.

Referring now to FIG. 6 the control relay assembly 4 comprises a number of electrical relays 30 mounted in a casing 31. The relays 30 are activated by associated switches on the remote operator panel 3. Visual indication of the operation of each relay is given by means of LED's 32 which can be observed through the casing 31. The relay assembly 4 is mounted adjacent the refrigeration unit 2 and is connected to the existing electrical system of the refrigeration unit.

In operation the refrigerated container control system 1 is first switched on by operating the switch 13. The operator then may activate the preheat switch 14 and when preheating is terminated the start switch 15 may be activated to start the automotive power drive 6 which is used to drive the existing refrigeration compressor 7 to operate the unit refrigeration system 2. The refrigeration system 2 will operate to control the container space 10 temperature within pre specified parameters of unit set point and indication of this controlled temperature heating, cooling and defrosting modes, is transmitted by short-range wireless communication with the remote operator panel 3 for monitoring, fault diagnostic, and recovery purposes.

During normal operation of the refrigeration unit 2 moisture tends to ice up the evaporator coil 8 which in turn reduces the efficiency of the refrigeration unit 2. There is incorporated within the remote control apparatus a manual defrost control which may be operated conveniently to activate the defrost mode of the refrigeration unit. In the event of a critical failure of the control circuitry within the defrost circuit, incorporated within the refrigeration unit, there is provided on the remote control apparatus an independent control circuit unlimited to pre-set parameters i.e. re programmable to ensure ultimately a fail safe defrost circuitry backup facility utilised to ensure the integrity of cargo temperature in the case of a failure of the normal operating system.

Conveniently control circuitry may be incorporated to allow remote resetting of refrigeration unit thermostat and display the current set-point. Also incorporated are four indicator LED's utilised to signal the current operational mode of the refrigeration system i.e. whether the cargo space temperature is above a certain level, between certain levels or below certain levels and a visual/audible alarm 33 to signify dangerous or unacceptable operating temperatures/conditions.

The invention provides a convenient refrigerated transport container control system for remote operation of a vehicle mounted refrigeration unit. The remote control assembly also provides for monitoring the operational conditions within the refrigeration unit.

The provision of an emergency backup defrost facility as described is particularly advantageous as container loads of goods have on occasion been destroyed as a result of faulty control circuitry which cannot be repaired without unloading the goods from the refrigeration space.

It will be appreciated that the control system may be of any suitable material of construction and the electrical components contained therein may be of any suitable type or configuration.

It will also be appreciated that in some cases the system may be adapted for universal remote control of refrigeration units. For example a portable master console and an associated slave device could be provided, the master console and slave being in two-way short-range radio communication with each refrigeration unit. The master console is a remote operator console for issuing remote radio control information for switching functions as well as remotely retrieving status data. The master console is battery operated and may have means for connection to an external power supply for recharging purposes. The remote slave unit is connected to the relay interface apparatus to carry out switching functions as directed by radio signals from the master console and to send status data to the master console.

It is also envisaged that the operator panel may be connected to a remote control station or office via a dedicated GMS networked transmitter/receiver unit for remote monitoring and or operational control of the refrigerated container. This would be particularly advantageous where the container is for example left on a quayside unaccompanied over a period of days awaiting loading or collection.

Indeed, the control of the refrigeration apparatus, and hence the climate within the container may be taken out of the hands of a driver and be remotely controlled from the remote control station at all times via a GSM link for example. The operator panel could in fact be located at a control station and connected by radio link for example with a locally mounted refrigerator operating means on a refrigerated container or the like. In this way the conditions within the container could be remotely monitored and controlled continuously from the control station even for example if the containers were being transported by ship.

Figure 15:
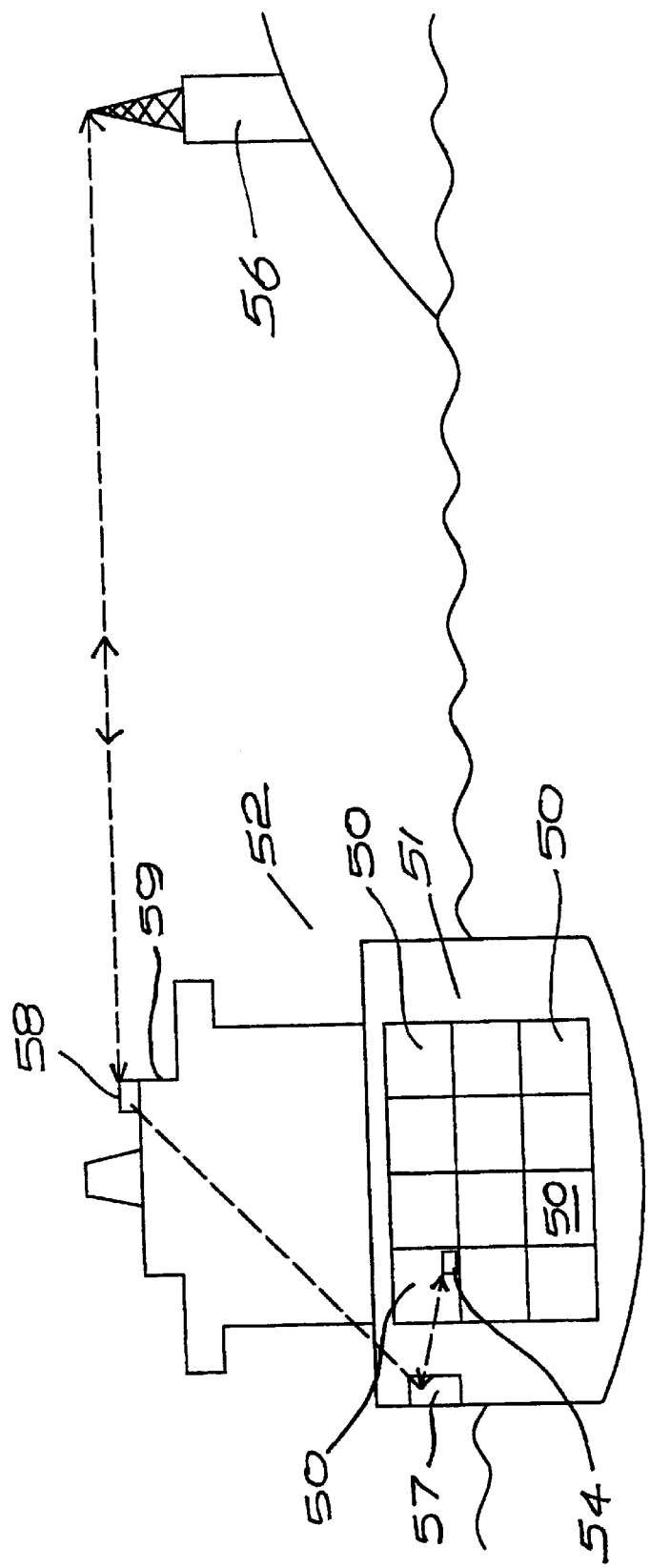
FIG. 15 is a schematic illustration of another refrigeration control system.

FIG. 15 schematically shows a number of refrigerated containers 50 within the hold 51 of a ship 52. Each container 50 has its own locally mounted refrigeration plant controller 54 which is connected via GMS link with a remote on-shore control station 56 which monitors and/or controls operation of the refrigeration apparatus to regulate the climate within each container 50. As it may not be possible to clearly transmit signals to and from the containers 50 in the hold 51, a first relay transceiver 57 is mounted within the hold 51 and connected by short-range radio link for example to an associated second transceiver 58 mounted on a bridge 59 of the ship 52 to ensure clear signalling between the containers 50 and the control station 56. Signals may be transmitted between the control station 56 and containers 50 selected by an operative in the control station 56. Also, monitoring information could be sequentially sent from each of the containers 50 in turn to the control station 56 in continuous cycles to keep a record of ongoing conditions within the containers 50. The refrigeration apparatus of any selected container 50 can be operated remotely from the control station 56 to maintain the climate within the container 50 within a safe operating range it such need arises.

The invention provides a refrigerated transport container control system for use within the transport refrigeration industry specifically designed for the remote control and monitoring of truck, trailer and container refrigeration units. The remote functionality allows operational data to be transferred to or from the unit operator/truck driver and also will allow remote operation and monitoring control of refrigeration unit via a GSM network device where units are accompanied or unaccompanied. Abnormal refrigeration unit operational data may be immediately transferred to a dedicated location automatically, for immediate attention.

The unit will display and record operational data and alert the operator of malfunctions within the operating refrigeration system, it will also allow the operator take corrective action when faults within the refrigeration system are diagnosed and brought to the operators attention. The invention allows comprehensive diagnostic facilities without the interference of excessive noise levels allowing more accurate fault diagnosis deductions to be made by the unit operator.

The control apparatus can reduce the risk of personal injury to the unit operator by providing an operational functionality a safe distance away from the machinery moving parts area. Safety issues are more easily addressed by reducing the unnecessary accessing of refrigeration equipment by untrained personnel reducing the level of risk with regard to personal injury through improper and unnecessary interference with refrigeration components while operating.

The remote operator panel and the refrigeration plant controller can have the facility to store all relevant machinery operational data for retrieval at a later stage. Data may be utilised to determine causes, times and dates of refrigeration unit mechanical breakdowns specifically useful for future preventative maintenance purposes. Sensors to detect abnormal or unacceptable vibration levels and incorrect drive belt tensions may be incorporated into the relay interface and relevant data transmitted to the operator panel/central monitoring station for immediate attention.

Figure 7:
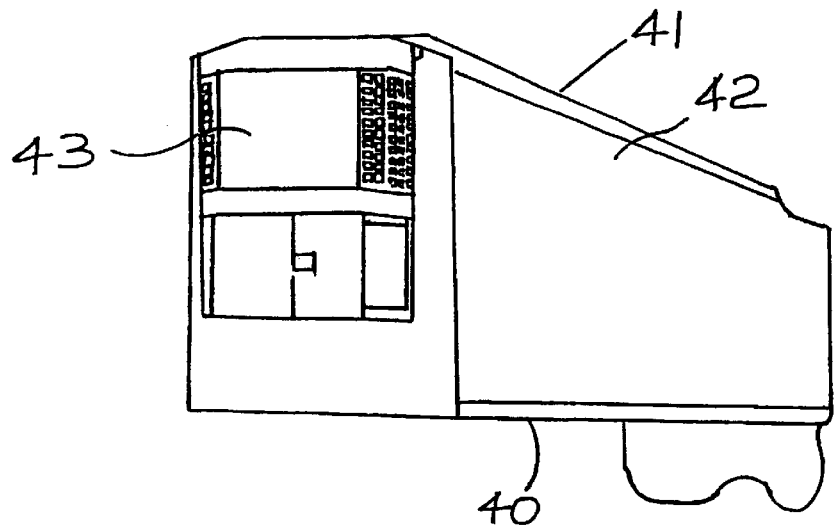
FIG. 7 is a perspective view of a conventional refrigerated trailer showing the location of local controls.

FIG. 7 illustrates a conventional articulated trailer 40 with a refrigerated transport container 41 comprising an enclosed cargo carrying container 42 defining a temperature controlled area 10 as previously described with an associated self-container refrigeration plant 43 which is typically mounted at a front end of the container 42.

Figure 8:
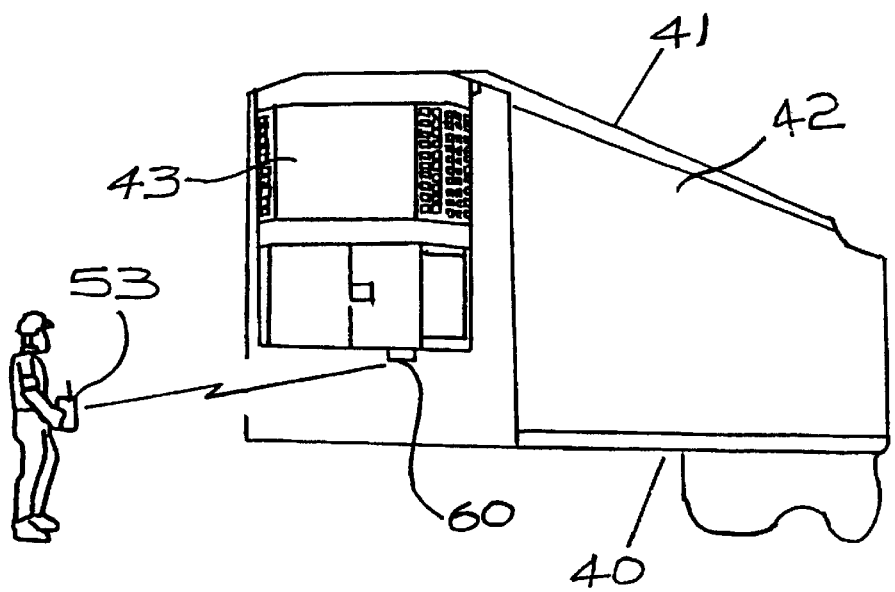
FIG. 8 is a view similar to FIG. 7 illustrating a refrigerated trailer incorporating the control system of the invention.

FIG. 8 illustrates the remote control of the refrigerated transport container 41 by way of wireless using short-range radio frequency signals to communicate between a remote operator panel 53 and a refrigeration plant controller 60. Note that the operator/driver would typically be sitting in the truck cab (not shown) when using or monitoring the remote operator panel 3.

Figure 9:
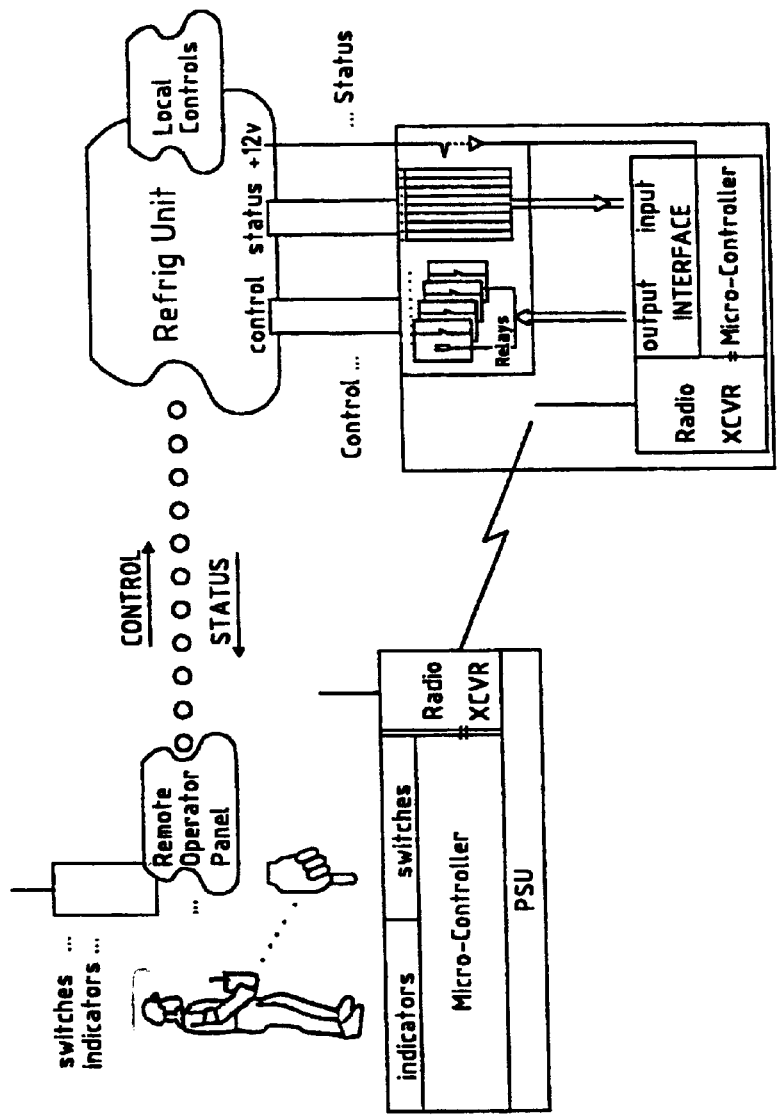
FIG. 9 schematically illustrates the refrigeration control system of the invention.

The refrigerated container control system of the invention consists of two components that, when paired, provide a remote means for the driver/operator to monitor and control the operation of the refrigeration unit plant 43. The two components consist of a remote operator panel 53 and a paired relay/interface assembly forming a refrigeration plant controller 60. FIG. 9 illustrates the two components that comprise the refrigerated container control system.

The remote operator panel 53 has a microcontroller 54 connected to indicators 55 and switches 56 on the remote operator panel 53 and controls generation of an operating signal for transmission by a short-range radio transceiver 57 and also receives wireless signals from the refrigeration plant controller 60 delivered through the transceiver 57.

The refrigeration plant controller 60 also has a short-range radio frequency transceiver 62 for wireless communication with the transceiver 57 of the remote operator panel 53. This transceiver 62 is connected to a microcontroller 63 which operates through an interface 64 to operate the refrigeration plant 43 through relays 65 as previously described and to receive information on the operating status of the refrigeration plant from associated sensing means 66 in the container 41 and refrigeration plant 43 of the refrigerated transport container 41.

While it is appreciated that while at a distribution centre multiple refrigeration control systems may be in operation, the electronic pairing of an individual remote control panel 53 to a specific refrigeration plant controller 60 will allow each individual refrigeration control system to operate completely transparent to others in an unambiguous manner.

The remote operator panel 53 device will be completely portable (ie. Handheld) and easy to detach from a mounting bracket fitted with in cab of the truck. The remote operator panel 53 will contain its own battery pack. It will be noted that a cradle could be incorporated to allow the remote operator panel 53 to be powered by the truck's battery and also to recharge the remote operator panel's internal battery pack when in the cradle.

The remote operator panel 53 provides the operator with a visual indication of the status of remote refrigeration unit functions and a means to control the refrigeration plant 43 remotely. A number of mono-coloured LEDs will be incorporated in the remote operator panel 53 enclosure to function as visual indicators, while a number of push-button switches will allow the operator with a means to remotely issue control functions to change/control the operation of the refrigeration unit, as well as to select different modes of operation of the remote operator panel 3 itself.

The remote operator panel 53 is managed by a single integrated circuit (IC) chip micro-computer(s) which provide the turn on/off of LED and audible indicators and the sampling of the push-button switches. In addition, an LCD display handler can be supported. Remote control information is digitally coded as needed and transferred to the paired Relay/Interface Assembly for remote turning on and off of relays. Conversely, sensor information digitally encoded by the Relay/Interface Assembly are transferred digitally (by wireless communication) for indicating audio and/or visual events at the Operator Panel.

The Operator Panel will employ a license-exempt short range radio transmitter/receiver pair to provide a wireless communication medium between the Operator Panel and the Relay/Interface assembly fitted at the refrigeration unit. The Operator Panel and Relay/Interface assembly are associated by a digitally coded ID to assure they are transparent to other devices that they are not associated with. The radio medium will be constantly monitored by the remote each refrigeration control components in anticipation of a change of activity being reported by the ID paired component.

A single-tone sonalert (i.e. beeper—sounder) can be incorporated to provide an audible indication to the operator/driver. The sonalert's output pattern and interval can be varied by the internal electronic circuits to provide a means to audibly encode 'Change of State' condition types for easy assessment by the operator/driver if intervention is required. For example:

three quick beeps might inform the operator that a NORMAL change of state has taken place. These would serve as a notification only and no operator/driver action would be required.

consecutive beeps which remain active until the operator issues a control function at the Operator Panel via pressing one or more pertinent switches.

a solid tone alert could indicate that a alarm/alert condition has been detected that "requires immediate action" or response by the operator/driver. The action required may or may not be readily performed via the Operator Panel. Manual intervention at the Refrigeration unit may be required.

A two line by 8 character 'alpha numeric' display could be employed on the Operator Panel to permit 'plan test messages' to be displayed for operator viewing. (i.e. status, operation instructions, alarm indications and other relevant information). The LCD display can be back-lighted in order to assure it can be made visible in darkness. The operator panel may also be installed and incorporated as an integral part of the vehicle cab dashboard.

The Relay/Interface Assembly component is fitted nearby the refrigeration unit. This component is hardwired to the refrigeration electro-mechanics, in a parallel fashion, in order to allow auxiliary control of the refrigeration unit at the Operator Panel.

The Relay/Interface Assembly is comprised of a single enclosure which is of automotive grade. Within the assembly enclosure are multiple 'heavy duty' relays which can be assessed via external connector points, as well as input connector points for wiring to refrigeration unit sensors. LEDs can be employed to provide visual indication as the on/off state of each relay (LED on if relay is on).

The Relay/Interface Assembly is managed by a single integrated circuit (IC) chip micro-computer(s) which provide the sequencing, timing, and the sampling of sensor inputs. Status and control information is digitally coded, and sent or received respectively, to the Operator Panel.

Sensor inputs are predominately intended for interfacing binary sensor units which may be either NO (normally open) or NC (normally closed). It is assumed that all binary sensors will have one connection point to a common ground.

A single RTD (resistance temperature device) input can be employed to provide an analogue style of input for use in tracking/monitoring the resistance change of a RTD sensor.

Several heavy duty 'non-latching' relays are included within the Relay/Interface Assembly. Each relay switch contact is wired separately to an external connection point. Relay solenoid connections are wired internally to Assembly Microcomputer electronics/drivers. Turning on and off of individual relays is typically controlled by way of digitally coded messages received from the Operator Panel via the radio channel. Each relay has an associated LED which indicates the on/off state of each relay. The LED can be viewed at the assembly enclosure. In addition to a visual indication of relay state via LEDs, the relay states will be remotely communicated to the Operator Panel as a positive indication to the operator at the Operator Panel as to the on/off state of relays.

The Relay/Interface Assembly will also employ a license-exempt short range radio transmitter/receiver pair to provide a wireless communication medium to the Operator Panel, normally fitted within the truck cab. The relay/Interface assembly is associated with its paired Operator Panel by way of a digital ID code which is included in each wireless communication interchange between the paired components. The radio medium will be constantly monitored in anticipation of a change of activity being reported.

Technical Specification
External Inputs

| Refrig Control System | Input Specification |
|---|---|
| Remote Operator Panel | no external inputs |
| Relay/Interface Assembly | interfaces up to 8 binary sensors (either NO or NC type, with common ground) interfaces at least one analogue RTD temperature sensor |

External Outputs

| Refrig Control System | Controls Specification |
|---|---|
| Remote Operator Panel | no external outputs |
| Relay/Interface Assembly | drives up to 10 heavy duty relays (non-latching) |

Controls

| Refrig Control System | Controls Specification |
|---|---|
| Remote Operator Panel | up to 10 SPST push-button switches (operator interface) |
| Relay/Interface Assembly | no physical controls |

Indicators

| Refrig Control System | Input Specification |
|---|---|
| Remote Operator Panel | drives up to 20 LEDs. one audible sonalert (beeper/sounder) supports 2 line x 9 character alphameric LCD panel display. |
| Relay/Interface Assembly | up to 10 LEDs. |

A low power 'license exempt' radio system can provide a viable communications medium between a portable Operator Panel and its associated Relay/Interface Assembly enclosure. The performance of the radio system in terms of range and communication data rates depend on several factors. Due to the variety of vehicle and refrigeration units, metal surfaces and physical obstructions will impair the radio systems range performance. Government limitations regarding the use of "licence exempt" transmitter ERP (effective radiated power) restrict the overall output and capabilities of the radio transmitter device. A practical guideline can be used to assure that a good performance can be achieved. Data throughput and responsiveness depends on the reliability of the radio system, the amount of speed and size of radio frames being transferred, and the amount of noise (i.e. other radio equipment nearby the radio channel and in close proximity).

Based on the application requirements, the reliability of operator panel to relay/interface assembly unit wireless communications favour reasonbly poor radio environments.

The refrigeration control system components should be designed to meet with stringent automotive grade standards.

| Refrig Control Apparatus | Environmental Specification |
|---|---|
| Operator Panel | Temperature: −40 to +85 degree C. Ingress Protection: IP65 |
| Relay/Interface Assembly | Ambient Operating Temperature: −40 to +85 degree C. Ingress Protection: IP65 |

Fail Safes

| Refrig Control Apparatus | Fall Sale Specification |
|---|---|
| Operator Panel | power on solicit of remote refrigerator sensor states and visual display. quiescent start up in a common default state. watch dog timer implemented transaction time-out delays audible alert if radio communications fails |
| Relay/Interface Assembly | power on reporting of refrigerator sensor states. quiescent start up in a common default (all relays off) state. watch dog timer implemented transaction time-out delays provisions for shutdown/purging of |

Physical Format and Size

| Refrig Control Apparatus | Physical Format and Size |
|---|---|
| Operator Panel | single PCB (inclusive/exclusive of radio transmitter/receiver components) PCB mounted switches, LEDs, and audible sounder PCB (possibly panel mounted) LCD display PCB targeted for less than 20 square inches suitable space allocated for internal batteries. |
| Relay/Interface Assembly | single PCB (inclusive/exclusive of radio transmitter/receiver components) PCB targeted for less than 24 square inches PCB mounted Relays, LEDs, and external connection points. |

Figure 10:
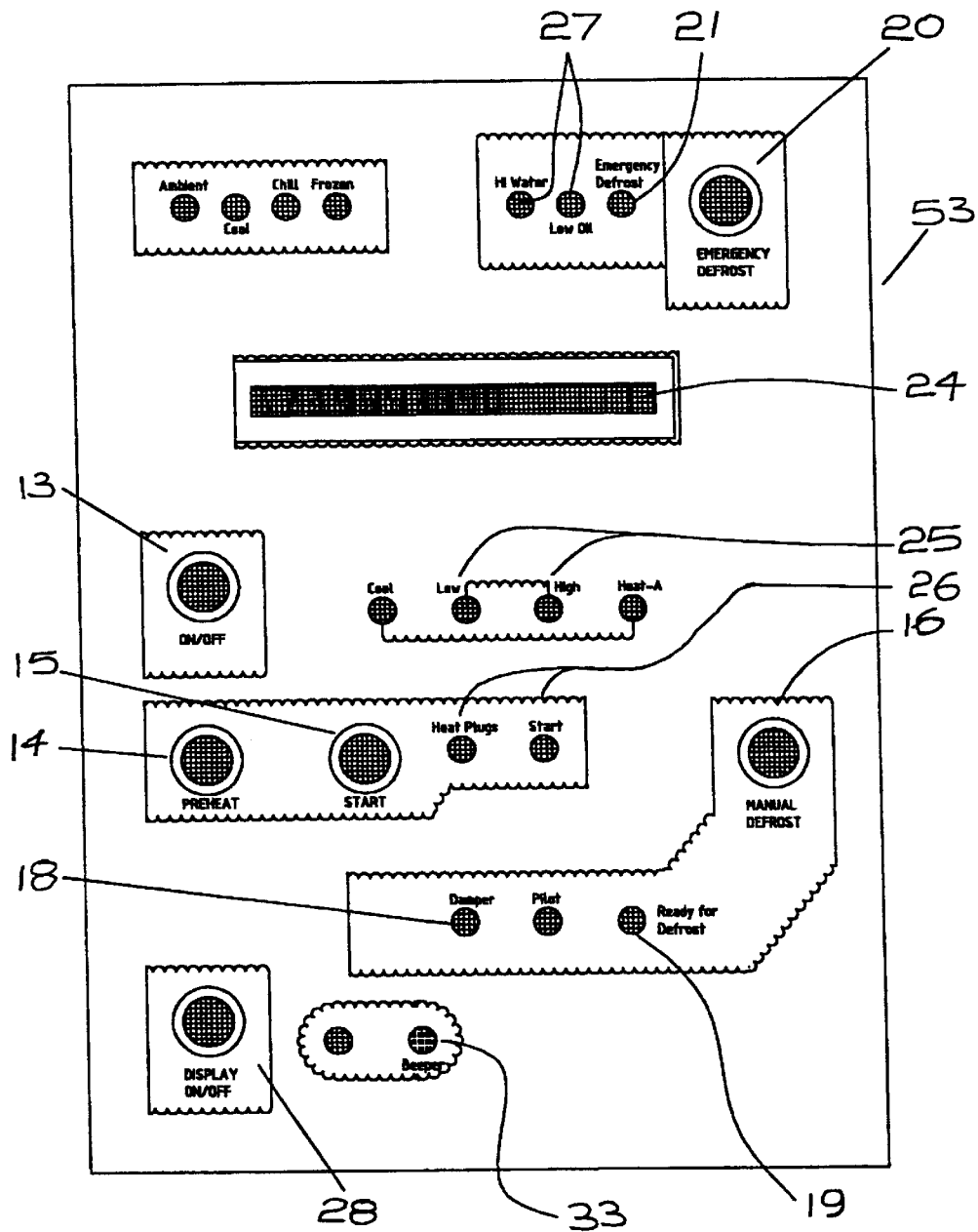

The remote operator panel 53 is shown in FIG. 10. Parts similar to those described previously are assigned the same reference numerals.

Operator Panel Indicators

LCD Display

Temperature Bar (4 leds)—ambient, cool, chill, frozen

Unconditionally displayed indicators (4 leds)—emergency defrost, ready-defrost, low-oil, hi-water.

Misc indicators (6 leds)—Preheat, Start, Low, Heat-A, High, Cool.

other (2 leds)—Pilot, damper also

Audio sounder (1×) and LED—audio & visual alert signalling

Operator Panel Switches

ON/OFF

PREHEAT

START

MANUAL-DEFROST

EMERGENCY-DEFROST

LED (enable/disable)

Relay Assembly/Interface (RELAYS)

Switch On/Off Relay

Preheat Relay

Start Relay

Damper over-ride Relay (emergency defrost)

Pilot over-ride Relay (emergency defrost)

Relay Assembly/Interface (Binary Sensors)

Klixon (50 ohm @ 1.7V when activated)

Hi Water (gnd)

Low Oil (gnd)

Pilot (+12)

Damper (+12)

High (+12)

Low (+12)

Preheat (+12)

Start (+12)

RTD (temp sensor) (8 bit analogue sensors)

Figure 11:
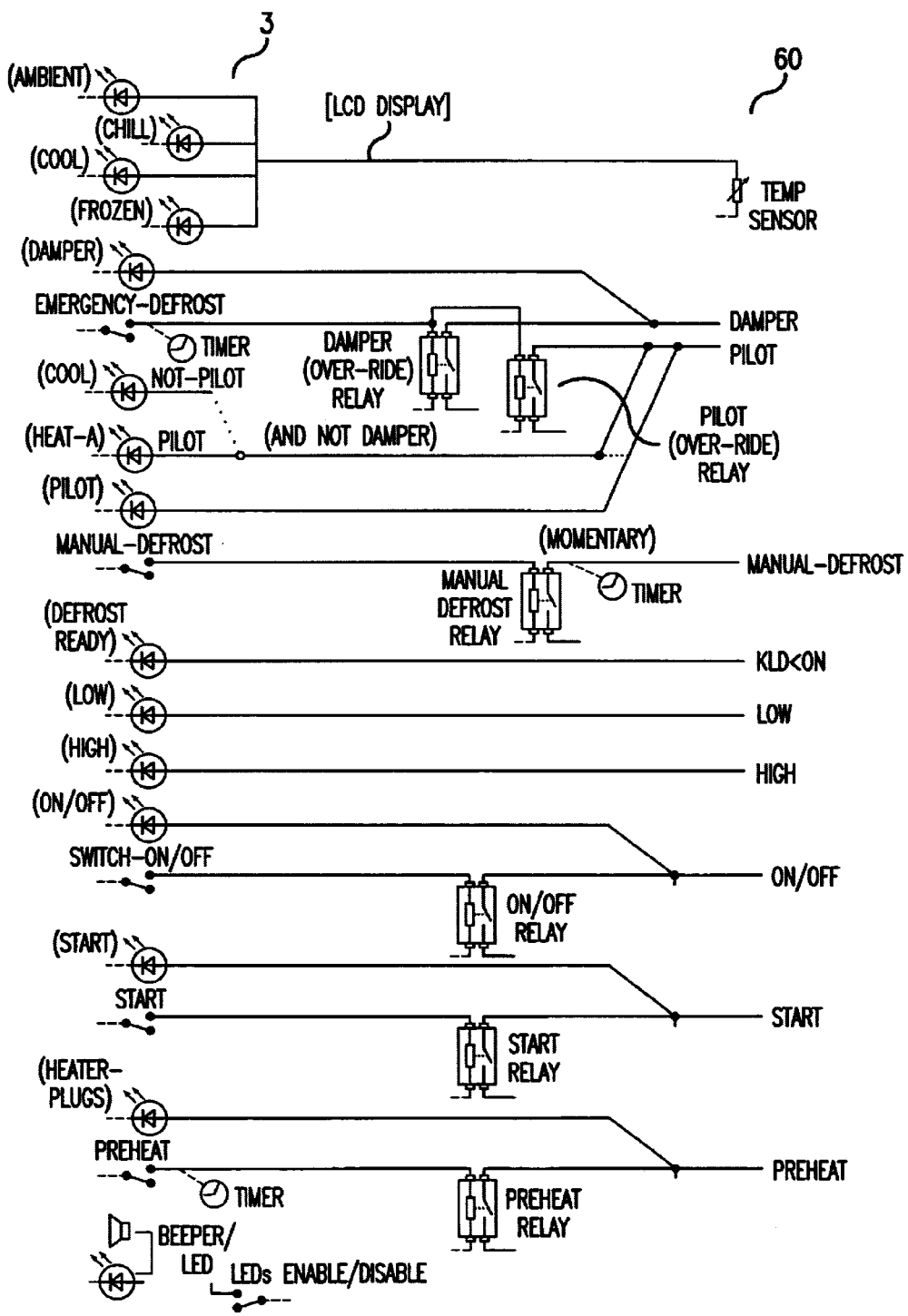
FIGS. 11 to 14 are circuit diagrams for the control system.
Figure 12:
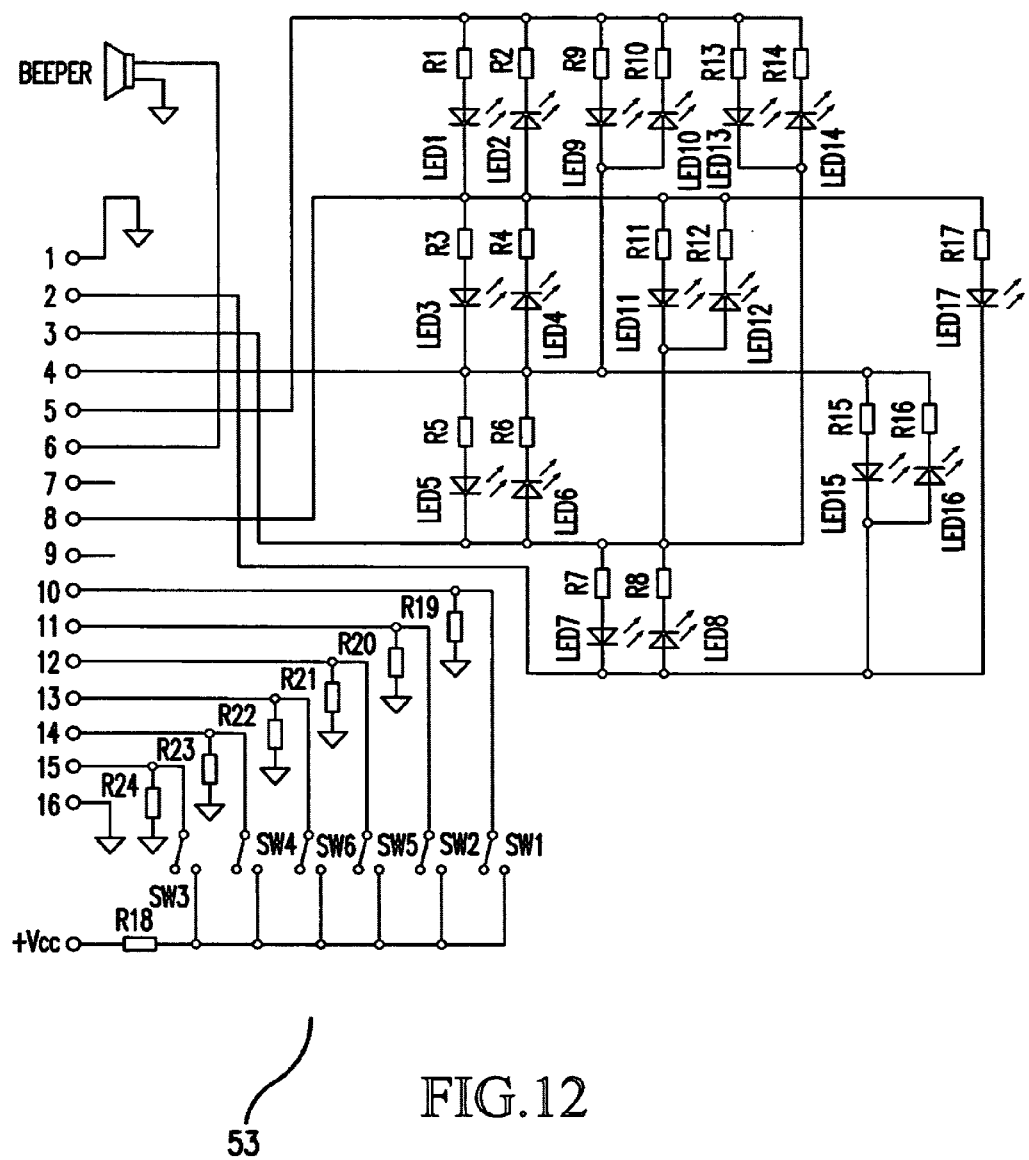
Figure 13:
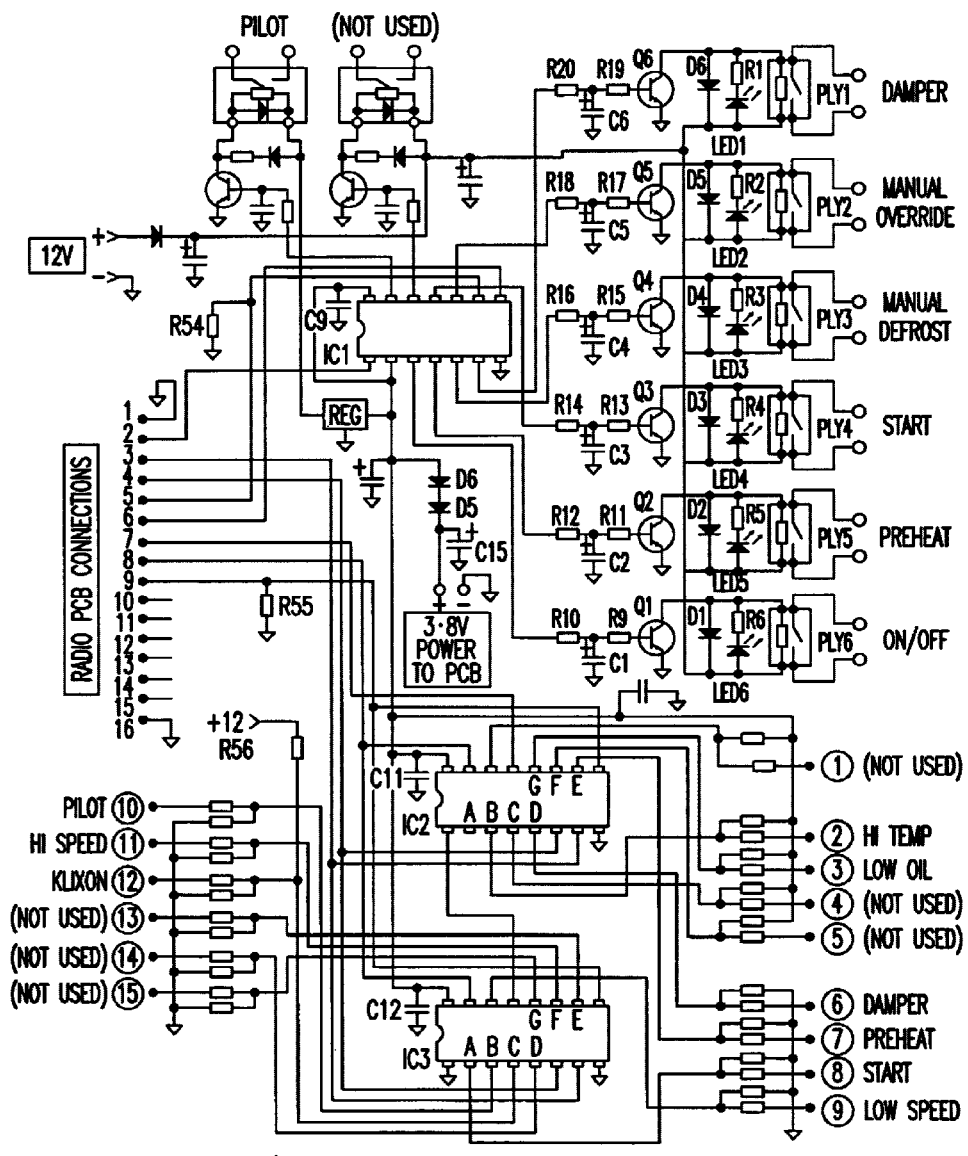
Figure 14:
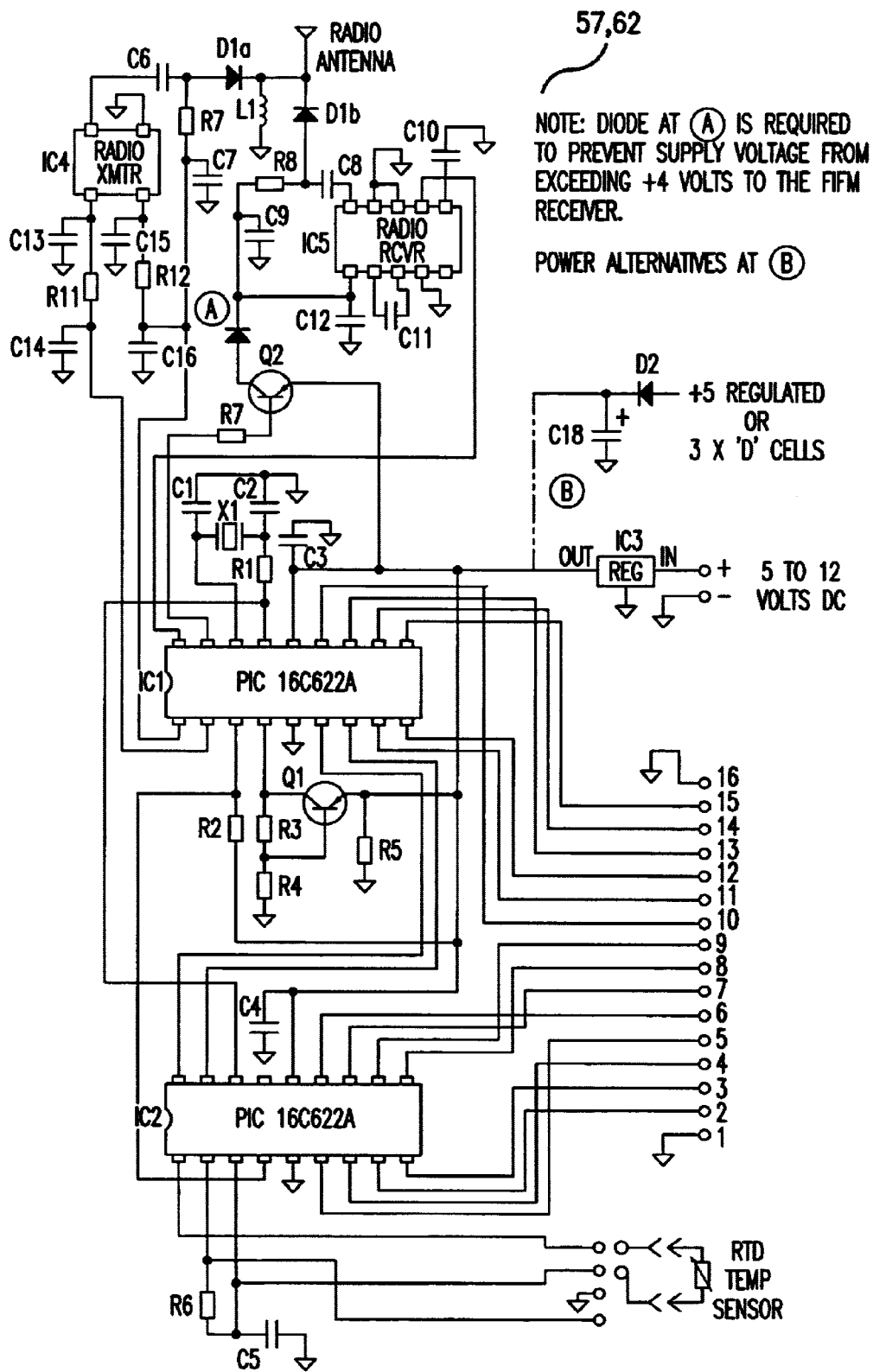

FIG. 11 shows schematically the co-operation between the remote operator panel 53 and the relay assembly/interface 60. FIG. 12 shows a schematic diagram of the operator panel 53 and FIG. 13 shows a schematic diagram of the relay assembly/interface 60. FIG. 14 shows a generic radio micro module schematic diagram.

Figure 16:
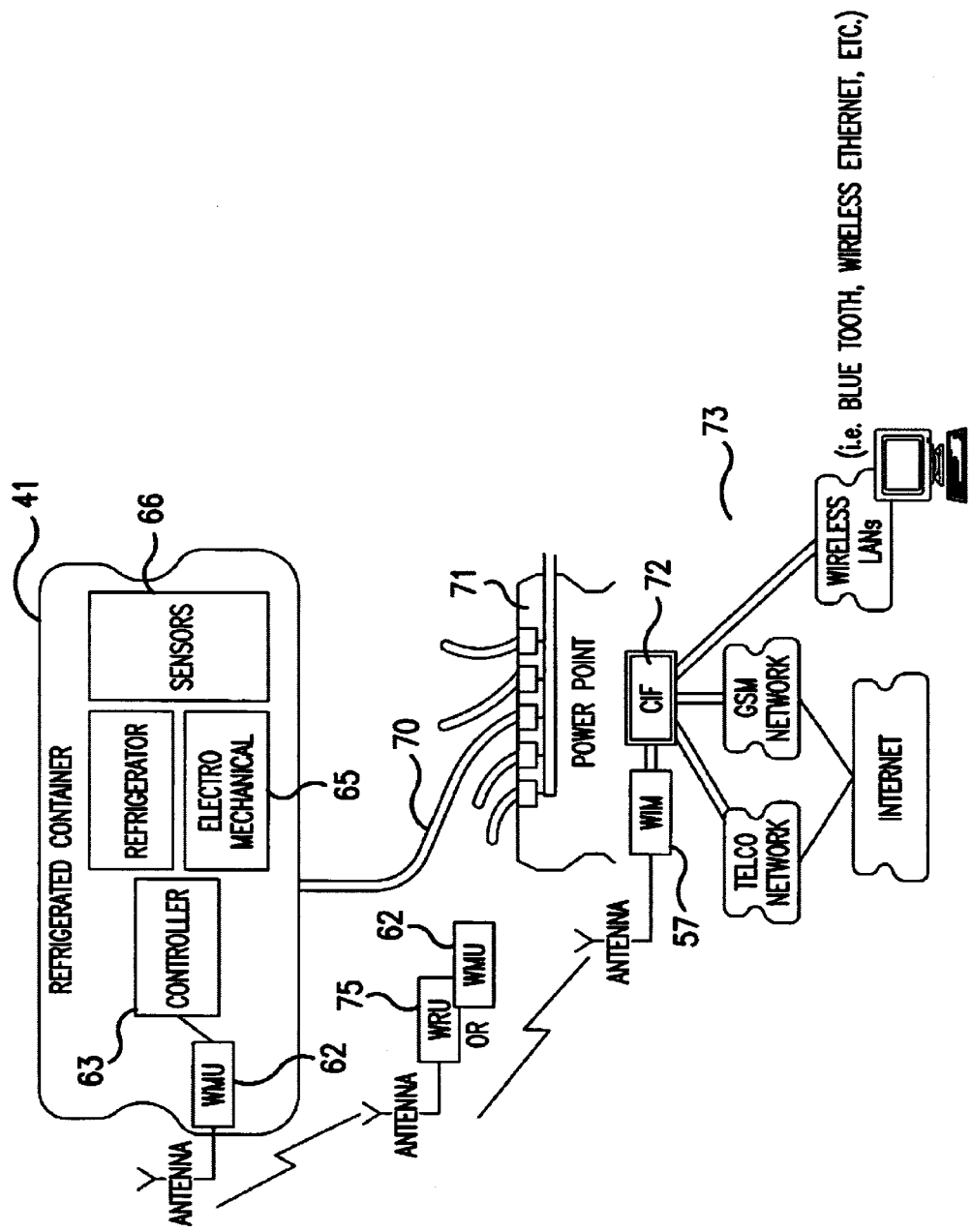
FIG. 16 and FIG. 17 are schematic illustrations of alternative control systems of the invention.

Referring now to FIG. 16 there is illustrated a refrigerated transport container control system according to another aspect of the invention. Parts similar to those described previously are assigned the same reference numerals. In this case the system is shown in operation in a storage depot or the like in which a number of refrigerated containers would be temporarily stored. Each refrigerated container 41 is connected by a power cable 70 with a local electrical power supply 71 in conventional fashion. In this case the radio transceiver 62 of a wireless monitoring unit on the container 41 is connected by short-range wireless connection with the radio transceiver 57 of an associated wireless interface module which connects to a communications interface unit 72. This communications interface unit 72 provides the functions of communications controller, external communications equipment interface hub and dialog manager for addressing the variety of communications media 73 that may be attached to the communications interface unit for remotely monitoring and/or controlling the refrigerated container 41 operating conditions. If desired intermediate wireless relay units 75 may be provided between the refrigerated container 41 and the wireless interface module 57, or, alternatively the short-range radio signal may be relayed via a wireless monitoring unit 62 on another container 41 within the depot.

Figure 17:
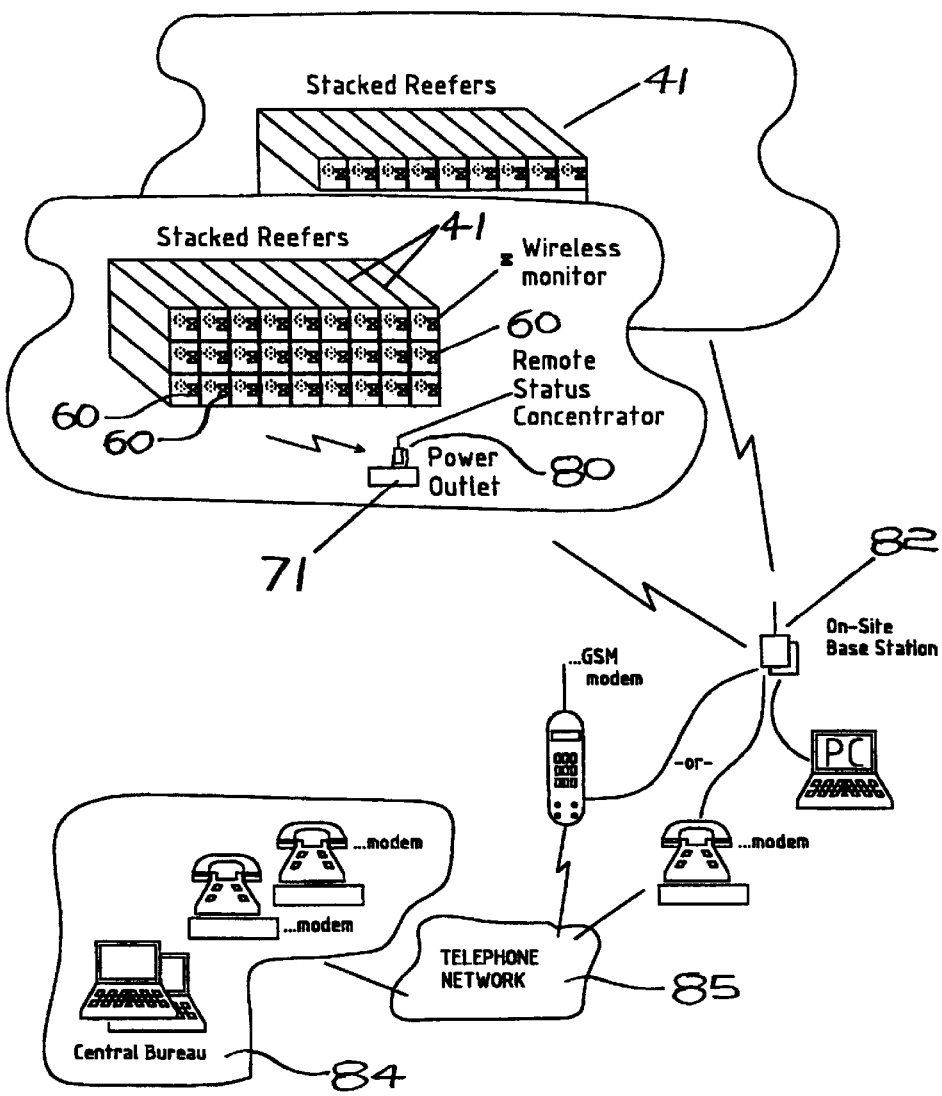

Referring now to FIG. 17 another arrangement for use in a storage depot is shown. A number of refrigeration containers 41 are stacked in rows as is usual in such depots. Each refrigeration plant controller 60 communicates by short-range wireless connection as previously described with a remote status concentrator 80 mounted at a power outlet 71 within the depot. This remote status concentrator 80 has a radio transceiver for receiving and relaying short-range radio signals between the refrigeration containers 41 and an on-site base station 82 at the depot. A remote operator panel 53 may be located at the base station 82 to allow on-site regulation of the refrigeration containers 41. Alternatively the control and monitoring of the refrigeration container 41 may be carried out from a remote central bureau 84 or the like via a telephone network 85 in communication with the base station 82.

The invention is not limited to the embodiments hereinbefore described, but may be varied in both construction and detail within the scope of the appended claims.

APPENDIX A

Operator Panel Parts List - FIG. 12

| Part | Description |
|---|---|
| Beeper | 3 v miniature buzzer |
| R1 | 47R ohm SM 0805 case |
| R2 | 47R ohm SM 0805 case |
| R3 | 47R ohm SM 0805 case |
| R4 | 47R ohm SM 0805 case |
| R5 | 47R ohm SM 0805 case |
| R6 | 47R ohm SM 0805 case |
| R7 | 47R ohm SM 0805 case |
| R8 | 47R ohm SM 0805 case |
| R9 | 47R ohm SM 0805 case |
| R10 | 47R ohm SM 0805 case |
| R11 | 47R ohm SM 0805 case |
| R12 | 47R ohm SM 0805 case |
| R13 | 47R ohm SM 0805 case |
| R14 | 47R ohm SM 0805 case |
| R15 | 47R ohm SM 0805 case |
| R16 | 47R ohm SM 0805 case |
| R17 | 47R ohm SM 0805 case |
| R18 | 1K0 ohm SM 0805 case |
| R19 | 10K ohm SM 0805 case |
| R20 | 10K ohm SM 0805 case |
| R21 | 10K ohm SM 0805 case |
| R22 | 10K ohm SM 0805 case |
| R23 | 10K ohm SM 0805 case |
| R24 | 10K ohm SM 0805 case |
| LED1 | LED 5 mm Ultra-bright -ORANGE |
| LED2 | LED 5 mm Ultra-bright -ORANGE |
| LED3 | LED 5 mm Ultra-bright -ORANGE |
| LED4 | LED 5 mm Ultra-bright -ORANGE |
| LED5 | LED 5 mm Ultra-bright -RED |
| LED6 | LED 5 mm Ultra-bright -RED |
| LED7 | LED 5 mm Ultra-bright -RED |
| LED8 | LED 5 mm Ultra-bright -AMBER |
| LED9 | LED 5 mm Ultra-bright -AMBER |
| LED10 | LED 5 mm Ultra-bright -AMBER |
| LED11 | LED 5 mm Ultra-bright -AMBER |
| LED12 | LED 5 mm Ultra-bright -AMBER |
| LED13 | LED 5 mm Ultra-bright -AMBER |
| LED14 | LED 5 mm Ultra-bright -AMBER |
| LED15 | LED 5 mm Ultra-bright -AMBER |
| LED16 | LED 5 mm Ultra-bright -ORANGE |
| LED17 | LED 5 mm Ultra-bright -RED |
| SW1 | Multimec Standalone Switch SPNO 3ETL9104 |
| SW2 | Multimec Standalone Switch SPNO 3ETL9104 |
| SW3 | Multimec Standalone Switch SPNO 3ETL9104 |
| SW4 | Multimec Standalone Switch SPNO 3ETL9104 |
| SW5 | Multimec Standalone Switch SPNO 3ETL9104 |
| SW6 | Multimec Standalone Switch SPNO 3ETL9104 |

APPENDIX B

Relay Assembly/Interface Parts List - FIG. 13

| Part | Description |
|---|---|
| IC1 | 74HCT164N (SIPO Shift Reg) DIL-14 |
| IC2 | 74HCT166N (PISO Shift Reg) DIL-16 |
| IC3 | 74HCT166N (PISO Shift Reg) DIL-16 |
| IC4 | MC78L05ACP Reg TO-92 case |
| Q1 | FZT649 hi current NPN SOT-223 case or equivalent |
| Q2 | FZT649 hi current NPN SOT-223 case or equivalent |
| Q3 | FZT649 hi current NPN SOT-223 case or equivalent |
| Q4 | FZT649 hi current NPN SOT-223 case or equivalent |
| Q5 | FZT649 hi current NPN SOT-223 case or equivalent |
| Q6 | FZT649 hi current NPN SOT-223 case or equivalent |
| Q7 | Gen Purpose NPN BC846 SOT-23 case |
| Q8 | Gen Purpose NPN BC846 SOT-23 case |
| D1 | Power diode SM D0-214BA case (i.e. 1N4001 SM) |
| D2 | Power diode SM D0-214BA case (i.e. 1N4001 SM) |
| D3 | Power diode SM D0-214BA case (i.e. 1N4001 SM) |
| D4 | Power diode SM D0-214BA case (i.e. 1N4001 SM) |
| D5 | Power diode SM D0-214BA case (i.e. 1N4001 SM) |
| D6 | Power diode SM D0-214BA case (i.e. 1N4001 SM) |
| D7 | 1N4001 diode |
| RLY1 | Enclosed SPCO-PX Relay (32 amp) |

APPENDIX B-continued

Relay Assembly/Interface Parts List - FIG. 13

| Part | Description |
|---|---|
| RLY2 | Enclosed SPCO-PX Relay (32 amp) |
| RLY3 | Enclosed SPCO-PX Relay (32 amp) |
| RLY4 | Enclosed SPCO-PX Relay (32 amp) |
| RLY5 | Enclosed SPCO-PX Relay (32 amp) |
| RLY6 | Enclosed SPCO-PX Relay (32 amp) |
| RLY7 | Dry reed SIL SPST relay |
| RLY8 | Dry reed SIL SPST relay |
| LED1 | General Purpose 5 mm LED (green) |
| LED2 | General Purpose 5 mm LED (green) |
| LED3 | General Purpose 5 mm LED (green) |
| LED4 | General Purpose 5 mm LED (green) |
| LED5 | General Purpose 5 mm LED (green) |
| LED6 | General Purpose 5 mm LED (green) |
| LED7 | General Purpose 5 mm LED (green) |
| LED8 | General Purpose 5 mm LED (green) |
| C1 | 2.2 uF cap 10 wvdc SM |
| C2 | 2.2 uF cap 10 wvdc SM |
| C3 | 1.0 uF cap 10 wvdc SM case A |
| C4 | 2.2 uF cap 10 wvdc SM |
| C5 | 2.2 uF cap 10 wvdc SM |
| C6 | 2.2 uF cap 10 wvdc SM |
| C7 | 10 uF cap 25 wvdc SM |
| C8 | 2.2 uF cap 25 wvdc SM |
| C9 | 100 nf cap SM 1206 case |
| C10 | 4.7 uF cap 10 wvdc SM |
| C11 | 100 nf cap SM 1206 case |
| C12 | 100 nf cap SM 1206 case |
| R1 | 1k0 ohm SM 0805 case |
| R2 | 1k0 ohm SM 0805 case |
| R3 | 1k0 ohm SM 0805 case |
| R4 | 1k0 ohm SM 0805 case |
| R5 | 1k0 ohm SM 0805 case |
| R6 | 1k0 ohm SM 0805 case |
| R7 | 1k0 ohm SM 0805 case |
| R8 | 1k0 ohm SM 0805 case |
| R9 | 4k7 ohm SM-0805 case |
| R10 | 4k7 ohm SM-0805 case |
| R11 | 4k7 ohm SM-0805 case |
| R12 | 4k7 ohm SM-0805 case |
| R13 | 4k7 ohm SM-0805 case |
| R14 | 4k7 ohm SM-0805 case |
| R15 | 4k7 ohm SM-0805 case |
| R16 | 4k7 ohm SM-0805 case |
| R17 | 4k7 ohm SM-0805 case |
| R18 | 4k7 ohm SM-0805 case |
| R19 | 4k7 ohm SM-0805 case |
| R20 | 4k7 ohm SM-0805 case |
| R21 | 10k ohm SM-0805 case |
| R22 | 10k ohm SM-0805 case |
| R23 | 4k7 ohm SM-0805 case |
| R24 | 10k ohm SM-0805 case |
| R25 | 47k ohm SM-0805 case |
| R26 | 4k7 ohm SM-0805 case |
| R27 | 47k ohm SM-0805 case |
| R28 | 4k7 ohm SM-0805 case |
| R29 | 47k ohm SM-0805 case |
| R30 | 4k7 ohm SM-0805 case |
| R31 | 47k ohm SM-0805 case |
| R32 | 4k7 ohm SM-0805 case |
| R33 | 4k7 ohm SM-0805 case |
| R34 | 10k ohm SM-0805 case |
| R35 | 4k7 ohm SM-0805 case |
| R36 | 10k ohm SM-0805 case |
| R37 | 4k7 ohm SM-0805 case |
| R38 | 10k ohm SM-0805 case |
| R39 | 4k7 ohm SM-0805 case |
| R40 | 10k ohm SM-0805 case |
| R41 | (omitted) |
| R42 | (omitted) |
| R43 | 4k7 ohm SM-0805 case |
| R44 | 10k ohm SM-0805 case |
| R45 | 4k7 ohm SM-0805 case |
| R46 | 10k ohm SM-0805 case |
| R47 | 4k7 ohm SM-0805 case |
| R48 | 10k ohm SM-0805 case |

APPENDIX B-continued

Relay Assembly/Interface Parts List - FIG. 13

| Part | Description |
|---|---|
| R49 | 4k7 ohm SM-0805 case |
| R50 | 10k ohm SM-0805 case |
| R51 | 4k7 ohm SM-0805 case |
| R52 | 10k ohm SM-0805 case |
| R53 | 4k7 ohm SM-0805 case |
| R54 | 10k ohm SM-0805 case |
|  | (additional components for modifications) |
| C13 | 2.2 uF cap 10 wvdc SM |
| C14 | 2.2 uF cap 10 wvdc SM |
| C15 | 4.7 uF cap 10 wvdc SM |
| D8 | BAS16 (1N4148 or equivalent) SOT-23 case |
| D9 | BAS16 (1N4148 or equivalent) SOT-23 case |
| R55 | 4k7 ohm SM-0805 case |
| R56 | 1k2 ohm SM-1206 case |

APPENDIX C

Generic Radio/Micro Module Parts List - FIG. 14

| Part | Description |
|---|---|
| IC1 | PIC 16F84-4P Microcontroller DIL-18 |
| IC2 | PIC 16F84-4P Microcontroller DIL-18 |
| IC3 | ZR78L033C +3.3 volt regulator TO-92 case |
| IC4 | RFM HX1007 433.92 Mhz transmitter (SM) |
| IC5 | RFM RX1010 433.92 Mhz transmitter (SM) |
| Q1 | Gen Purpose PNP SOT-23 case (BC856 or Equiv) |
| Q2 | Gen Purpose PNP SOT-23 case (BC856 or Equiv) |
| D1 | HSMP-3824 dual pin diode SM SOT-23 case |
| X1 | 4.0 Mhz Crystal HC49/U low profile |
| L1 | 1.0 uH inductor - SM 1812 case |
| C1 | 22 pF cap SM 0805 case |
| C2 | 22 pF cap SM 0805 case |
| C3 | 100 nF cap SM 0805 case |
| C4 | 100 nF cap SM 0805 case |
| C5 | 33 nF cap SM 0805 case |
| C6 | 470 pF cap SM 0805 case |
| C7 | 470 pF cap SM 0805 case |
| C8 | 470 pF cap SM 0805 case |
| C9 | 470 pF cap SM 0805 case |
| C10 | 1 uF Cap 10 wvdc SM |
| C11 | 1 uF Cap 10 wvdc SM |
| C12 | 4.7 uF Cap 10 wvdc SM |
| C13 | 1 pF cap SM 0603 case |
| C14 | 10 pF Cap SM 0603 case |
| C15 | 1 pF Cap SM 0603 case |
| C16 | 12 pF Cap SM 0603 case |
| C17 | 10 uF Cap 10 wvdc SM |
| R1 | 100R ohm SM 0805 case |
| R2 | 33K ohm SM 0805 case |
| R3 | 39K ohm SM 0805 case |
| R4 | 620K ohm SM 0805 case |
| R5 | 10K ohm SM 0805 case |
| R6 | 22K ohm SM 0805 case |
| R7 | 1K5 ohm SM 0805 case |
| R8 | 3K3 ohm SM 0805 case |
| R9 | (omitted) |
| R10 | (omitted) |
| R11 | 150R SM 0805 case |
| R12 | 20R SM 0805 case |
| C18 | 10 uF Cap 10 wvdc SM |
| D2 | Gen Purpose NPN BC846 SOT-23 case |
| RTD | Thermistor Temp Sensor (10 k ohm @ 25 deg. C.) (Phillips 2322-640-54130) . . . 2% |

What is claimed is:

1. A control system for a refrigerated transport container of the type comprising a self contained refrigeration plant connected to an associated enclosed refrigeration compartment within the container and operable to regulate the temperature within the compartment, the control system comprising:

sensing means for mounting on the refrigerated transport container for sensing at least one critical operating parameter of the refrigerated transport container, said sensing means being connected to a radio signal generating means for generating a radio frequency signal corresponding to said sensed parameter condition, said radio signal generating means being connected to a short range radio transmitter for transmitting said measured parameter radio signal together with an associated refrigerated transport container identity code radio signal, a remote operator panel having a radio receiver with means for reception of a radio signal incorporating the refrigerated transport container identity code, the remote operators panel having a display means for indicating a fault condition of said measured parameter, said remote operator panel radio receiver being connected to the display means for fault indication, the remote operator panel having means for generating an operating signal to control operation of the refrigeration plant with a view to correcting any abnormal operating condition sensed by said sensing means, said operating signal generating means being connected to a radio signal generating means for generating a radio frequency signal corresponding to said operating signal, said radio signal generating means being connected to a short range radio transmitter for transmitting said radio signal together with the associated refrigerated transport container identity code radio signal, a radio receiver for mounting on the refrigerated transport container having means for reception of a radio signal incorporating said refrigerated transport container identity code, and said radio receiver being connected to a refrigeration plant controller which is operable in response to reception of an operating signal to control operation of the refrigeration plant.

2. A system as claimed in claim 1, wherein said remote operator panel is a portable hand-held unit.

3. A system as claimed in claim 1, wherein the short range radio transmitters are operable to transmit radio frequency signals at 433 megahertz.

4. A system as claimed in claim 1, wherein the refrigeration plant controller is connected in parallel to the normal operating controls of the refrigeration plant to allow either remote operation or local operation of the refrigeration plant.

5. A system as claimed in claim 1, wherein the remote operator panel has a visual display indication of the parameter measured by the sensor.

6. A system as claimed in claim 1, wherein the remote operator panel has alarm means for generating an audible alarm in response to a sensed fault in the measured refrigerated transport container operating parameter.

7. A system as claimed in claim 1, wherein the remote operator panel has means for switching the refrigeration plant on or off.

8. A system as claimed in claim 1, wherein the sensor is at least one temperature sensor mounted within the refrigeration container.

9. A system as claimed in claim 8 wherein the temperature sensor incorporates a short range radio transmitter for wireless transmission of sensed temperature to the refrigeration plant controller or to the remote operator panel.

10. A method for controlling operating conditions in a refrigerated transport container, comprising the steps:

sensing at least one critical operating parameter of the refrigerated transport container;

generating a radio frequency signal corresponding to said sensed parameter condition;

coupling said measured parameter radio signal, together with a refrigerated transport container identity code radio frequency signal both forming a composite radio frequency signal;

transmitting said composite radio frequency signal on a short-range radio transmitter;

on a remote operator panel receiving said composite signal incorporating the said refrigerated transport container identity code on a radio receiver of the remote operator panel;

display any measured parameter abnormal operating condition on the remote operator panel;

generating an operating signal to control operation of the refrigeration plant with a view to correcting any abnormal condition;

generating a radio frequency signal corresponding to said operating signal and coupling said radio frequency operating signal with the refrigerated transport container identity code radio frequency signal thus forming a composite radio frequency signal;

transmitting said composite signal on a short-range radio transmitter; and receiving said composite signal on a radio receiver associated with a refrigeration plant controller for the refrigerated transport container, said operating signal directing the refrigeration plant controller in operating the refrigerating plant.

\* \* \* \* \*